US011180826B2

(12) United States Patent
Hsu (10) Patent No.: US 11,180,826 B2
(45) Date of Patent: Nov. 23, 2021

(54) TIN STRIPPING METHOD

(71) Applicant: UWin Nanotech. Co., Ltd., New Taipei (TW)

(72) Inventor: Ching-Hsiang Hsu, New Taipei (TW)

(73) Assignee: UWIN NANOTECH CO., LTD., New Taipei (TW)

( * ) Notice: Subject to any disclaimer, the term of this patent is extended or adjusted under 35 U.S.C. 154(b) by 318 days.

(21) Appl. No.: 16/294,043

(22) Filed: Mar. 6, 2019

(65) Prior Publication Data

US 2019/0203319 A1 Jul. 4, 2019

Related U.S. Application Data

(63) Continuation of application No. 14/702,205, filed on May 1, 2015, now abandoned.

(30) Foreign Application Priority Data

Jun. 25, 2014 (TW) .................................. 103121851
Nov. 12, 2014 (TW) .................................. 103139181

(51) Int. Cl.
*C22B 25/06* (2006.01)
*C22B 3/00* (2006.01)
(Continued)

(52) U.S. Cl.
CPC .............. *C22B 25/06* (2013.01); *C22B 25/04* (2013.01); *C23F 1/30* (2013.01); *C23F 1/44* (2013.01); *C23F 1/46* (2013.01); *Y02P 10/20* (2015.11)

(58) Field of Classification Search
CPC . C22B 25/04; C22B 25/06; C23F 1/30; C23F 1/44; C23F 1/46; Y02P 10/228
See application file for complete search history.

(56) References Cited

U.S. PATENT DOCUMENTS 3,540,840 A * 11/1970 Johnson ................... B01J 23/92
423/93
3,748,105 A 7/1973 Reen et al.
(Continued)

FOREIGN PATENT DOCUMENTS

CN 101067168 A 11/2007
CN 102671581 A 9/2012
(Continued)

OTHER PUBLICATIONS

Ash, M. "Potassium phosphate." Handbook of Preservatives. 2004. Synapse Info Resources. p. 503 (2004).
(Continued)

*Primary Examiner* — Nicholas A Wang
(74) *Attorney, Agent, or Firm* — Birch, Stewart, Kolasch & Birch, LLP (57) ABSTRACT

The present invention provides an additive for tin stripping, comprising 0.1 to 20 wt % of copper corrosion inhibitor and 0.1 to 20 wt % of nickel corrosion inhibitor; wherein said weight percentage is based on the total weight of said additive. The present additive can be used with nitric acid conventionally used for metal-stripping for not only reducing the usage of nitric acid but also improving the efficiency of tin stripping. The present invention also provides a method for Tin recycle and a reaction tank for metal recycle. Both of them are favorable for satisfying the needs of metal recycle (especially, tin recycle) in the field.

10 Claims, 9 Drawing Sheets

(51) Int. Cl.
*C23F 1/44* (2006.01)
*C23F 1/30* (2006.01)
*C23F 1/46* (2006.01)

(56) References Cited

U.S. PATENT DOCUMENTS

| | | |
|---|---|---|
| 4,303,568 A | 12/1981 | May et al. |
| 4,338,209 A | 7/1982 | Manabe et al. |
| 4,374,744 A | 2/1983 | Kawanabe et al. |
| 4,397,753 A | 8/1983 | Czaja |
| 4,713,144 A | 12/1987 | Schiller |
| 4,919,752 A | 4/1990 | Mika |
| 5,755,950 A * | 5/1998 | Bell .......... C23F 1/44 205/445 |
| 6,228,283 B1 * | 5/2001 | Turcotte ........ C02F 5/10 252/73 |
| 2003/0132416 A1 | 7/2003 | Boguslavsky et al. |
| 2008/0108539 A1 | 5/2008 | Kany et al. |
| 2010/0022427 A1 | 1/2010 | Warkotsch et al. |

FOREIGN PATENT DOCUMENTS

| | | | |
|---|---|---|---|
| CN | 102732892 A | | 10/2012 |
| KR | 10199000008505 | | 11/1990 |
| KR | 20120035438 | * | 5/2010 |
| TW | 312707 B | | 5/1986 |
| TW | 200721295 A | | 6/2007 |
| TW | I292932 | | 1/2008 |
| WO | WO2013090517 | * | 6/2013 |

OTHER PUBLICATIONS

Souissi et al. "Modelling of phosphate inhibition of copper corrosion in aqueous chloride and sulphate media" 2008. Corrosion Science. 50. p. 231-241 (2008).

* cited by examiner

TIN STRIPPING METHOD

CROSS-REFERENCE TO RELATED APPLICATIONS

This application is a Continuation of copending application Ser. No. 14/702,205, filed on May 1, 2015, which claims priority under 35 U.S.C. § 119(a) to Application Nos. 103139181 and 103121851, filed in Taiwan on Nov. 12, 2014 and Jun. 25, 2014, respectively, all of which are hereby expressly incorporated by reference into the present application.

BACKGROUND

Technical Field

The present disclosure relates to an additive for metal-stripping; especially for Tin-stripping.

Description of Related Art

From ancient times, minerals are closely linked with the development of human society and science. Nowadays, their importance is even more in the electronic industry of modern technology. Various elements of electronic industry, such as a central processing unit, a printed circuit board, a memory, a flip chip, or even a concealed antenna equipped inside the outer shell of a mobile phone, contain metal-plated parts. In fact, those metal-plated parts play important roles in the device. However, minerals resources are not unlimited; therefore, under the sustainable development consideration, how to recycle the metal materials from those metal-plated parts has become a critical task in the industry.

Conventional recycle manners for printed circuit boards (PCBs) in the field include burning method, acid-washing method, mechanical physical recycling method, etc. Burning method is to burn the waste PCBs crashed at high temperature to breakdown and to destroy the resin thereof and then obtain the noble metals therefrom. However, the burning method may cause air pollution because of the bromine-containing waste gas and dioxin resulted from the burning of the PCBs. Acid-washing method is to wash the waste PCBs with strong acid and then obtain a wash-off solution containing noble metals. Then, the noble metals therein are purified via electrolysis or acid-alkaline precipitation process. Mechanical physical recycling method is to crash the waste PCBs and separate the metal materials and non-metal materials by different density. Then, the metal materials are recycled by magnetic manner. The purity of the metal obtained through this method is too low to be ideal.

In 2003, the European Union announced the RoHS Guideline and officially prohibited Pb-containing electronic products, which resulted in the increased demand of Pb-free Tin paste and the price of Tin was also significantly raised. Therefore, a Tin recycling method with high recycling efficiency and environmental-friendly property is in urgent need.

SUMMARY

One of the objects of the present invention is to provide a novel tin stripping additive and a tin stripping solution containing the same, which perform good efficiency in tin-stripping while reducing the usage amount of nitric acid; thereby operation thereof is much safer and the impact on environment would be less.

Another object of the present invention is to provide a novel method for tin-recycling, which is favorable for recycling tin from waste electronic elements in high efficiency and thereby achieving the goal of metal recycling.

Yet another object of the present invention is to provide a novel reaction tank, whose structure is designed particularly for metal recycling and especially for operating the aforesaid method for tin-recycling.

In order to achieve the aforesaid objects, the present invention provides a tin stripping additive, comprising: 0.1 to 20 wt % of copper corrosion inhibitor; and 0.1 to 20 wt % of nickel corrosion inhibitor; wherein, remaining wt % of said tin stripping additive is a solvent; wherein, said wt % is based on the total weight of said tin stripping additive.

Preferably, said copper corrosion inhibitor is a phosphate salt.

Preferably, said phosphate salt is potassium phosphate, potassium dihydrogen phosphate, dipotassium phosphate, trisodium phosphate, or a combination thereof.

Preferably, said nickel corrosion inhibitor is sodium oxalate, ammonium chloride, potassium carbonate, sodium metanitrobenzene sulfonate, or a combination thereof.

The present invention also provides a tin stripping solution, comprising: 20 to 50% (v/v) of the aforesaid tin stripping additive; and 20 to 50% (v/v) of nitric acid; wherein said % (v/v) is based on the total volume of said tin stripping solution.

Preferably, said nitric acid is of a concentration of 67 to 68 wt %.

Preferably, said tin stripping solution further comprises a solvent. Preferably, said solvent is water.

The present invention yet provides a method for tin-recycling, comprising the following steps: (A) immersing an object to be processed into the aforesaid tin stripping solution to obtain a wash-off solution; (B) adding an alkaline solution to said wash-off solution to obtain a precipitate; (C) heating said precipitate; and (D) conducting a reduction reaction to said precipitate being heated in said step (C) to obtain tin.

Preferably, said immersing is achieved by placing said object to be processed into a bath of said tin stripping solution.

Preferably, said bath is of a temperature of 20 to 60° C.

Preferably, said alkaline solution is sodium hydroxide, potassium hydroxide, or a combination thereof.

Preferably, said heating of said step (C) is conducted at a temperature of 600 to 800° C.

Preferably, said reduction reaction is conducted by heating said precipitate of step (C) in a gas mixture atmosphere of hydrogen and nitrogen.

Preferably, said gas mixture comprises: 20 to 30% (v/v) of hydrogen; and 70 to 80% (v/v) of nitrogen; wherein said % (v/v) is based on the total volume of said gas mixture.

Preferably, said gas mixture is supplied to said reduction reaction as a gas flow with a flow speed of 100 to 500 ml/min.

Preferably, said reduction reaction is conducted at a temperature of 200 to 800° C.

Preferably, said method further comprises a filtration step after said step (A) and before said step (B).

Preferably, said filtration step is a filter-paper filtration, a bag filtration, a filter-press filtration, a vane filtration, a cross-flow filtration, a centrifugal filtration, a Dorr filtration, a hydraulic cyclone filtration, a membrane filtration, or a combination thereof.

Preferably, said method further comprises a washing step after said step (B).

The present invention further provides a reaction tank, comprising a body, comprising an inlet, an outlet, a sidewall, and a gas inlet; wherein said sidewall defines an inner space; wherein an area of said inner space adjacent to said outlet is a collection area; a first heating apparatus, positioned to surround at least parts of said sidewall; and a sieve, positioned inside said inner space to separate said inner space into two spaces.

Preferably, the shape of said body is a tapered structure at said collection area and is connection with said outlet.

Preferably, a collection tray is position inside said body at said collection area.

Preferably, said first heating apparatus is at a relative position to said sieve inside said inner space.

Preferably, said reaction tank further comprises a second heating apparatus; wherein the position of said second heating apparatus is corresponding to the position of said collection area.

Preferably, said heating apparatus is a furnace, a heating tape, or a combination thereof.

Preferably, said sieve has plural pores with an average diameter of 0.1 to 1 mm.

Preferably, said reaction tank further comprises a gas supply device; wherein said gas supply device is connection with said gas inlet for supplying gas into said inner space.

Preferably, said reaction tank is used for the purification of tin.

To sum up, the present invention provides a tin stripping additive, which can be used together with nitric acid (what is conventionally used for metal stripping) as the present tin stripping solution. The usage of the present tin stripping additive can favorably reduce the usage amount of nitric acid while maintain the tin-stripping efficiency in a desired level; therefore is more friendly to the environment. The present invention also provides a method for tin-recycling by using said tin stripping additive/tin stripping solution as well as a reaction tank, which can operate correspondingly with said method for tin-recycling. Said method for tin-recycling has the advantages of ease in operation and being friendly to the environment. The present reaction tank has a structure particularly designed for operating the metal recycling procedure more smoothly.

DETAILED DESCRIPTION

The present invention is related to a tin stripping additive and a tin stripping solution containing the same. The present invention is also related to a method for tin-recycling by using said tin stripping solution and a reaction tank, which is particularly suitable for tin-recycling.

The first aspect of the present invention is a tin stripping additive, which can be used together with nitric acid (which is conventionally used for metal stripping) and thereby the usage amount of nitric acid can be reduced. The present tin stripping additive comprises 0.1 to 20 wt % of copper corrosion inhibitor; and 0.1 to 20 wt % of nickel corrosion inhibitor; wherein, remaining wt % of said tin stripping additive is a solvent; wherein said wt % is based on the total weight of said tin stripping additive. Said solvent includes but not limited to water. In an alternative embodiment, said tin stripping additive further comprises a solvent for favorably mixing said copper corrosion inhibitor and said nickel corrosion inhibitor. Preferable, said solvent is water.

In an alternative embodiment, said copper corrosion inhibitor is a phosphate salt. Preferable, said phosphate salt includes but not limited to potassium phosphate, potassium dihydrogen phosphate, dipotassium phosphate, trisodium phosphate, or a combination thereof. In an alternative embodiment, said nickel corrosion inhibitor includes but not limited to sodium oxalate, ammonium chloride, potassium carbonate, sodium metanitrobenzene sulfonate, or a combination thereof.

It is important to note that although the present tin stripping additive is particularly suitable to be used together with nitric acid, said tin stripping additive being used is not limited in this way. In other words, the present tin stripping additive can also be used together with other conventional working solution for metal stripping to obtain the desired metal stripping effect.

The second aspect of the present invention is a tin stripping solution, comprising 20 to 50% (v/v) of said tin stripping additive and 20 to 50% (v/v) of nitric acid; wherein said % (v/v) is based on the total volume of said tin stripping solution. In a preferable embodiment of the present invention, the ratio of said tin stripping additive and said nitric acid is 1:1 in volume; that said, in this preferable embodiment, the present tin stripping additive can replace half usage amount of the nitric acid and therefore significantly reduce the impact on the environment as well as the risk in operation. In an alternative embodiment, the nitric acid used for preparing said tin stripping additive is at a concentration of 67 to 68 wt %; usually, the commercially available nitric acid is at the concentration of 68 wt %.

In an alternative embodiment, said tin stripping solution further comprises a solvent. Preferably, said solvent is water. There may be some benefit from adding a solvent such as: to obtain a better mixing of said tin stripping additive and said nitric acid, and/or to increase the total volume of said tin stripping solution for favorably immersing an object to be processed therein.

The third aspect of the present invention is a method for tin-recycling, comprising the following steps: (A) immersing an object to be processed into said tin stripping solution to obtain a wash-off solution; (B) adding an alkaline solution to said washing to obtain a precipitate; (C) heating said precipitate; and (D) conducting a reduction reaction to said precipitate being heated in said step (C) to obtain tin.

In an alternative embodiment, said immersing is achieved by placing said object to be processed into a bath of said tin stripping solution. In a preferable embodiment, said object to be processed is shaken in said bath in said step (A) to facilitate the reaction. In a preferable embodiment, during said immersing in said step (A), a circulating fluid flow is generated in said bath to facilitate the reaction. In an alternative, embodiment, said bath is of a temperature of 20 to 60° C.

After being processed in said step (A), said object is discarded from said bath and said wash-off solution is collected. The resulting wash-off solution contains said tin stripping solution and metal materials stripped from said object. Then, an alkaline solution is added to said wash-off solution to conduct said step (B). A precipitate, composed mainly of tin (II) hydroxide, can be obtained while the reaction between said alkaline solution and said wash-off solution are sufficiently conducted. In an alternative embodiment, said alkaline solution is sodium hydroxide, potassium hydroxide, or a combination thereof.

Afterwards, said precipitate is collected and heated in the air (step (C)). During the heating, tin (II) hydroxide interacts with air resulting the generation of tin dioxide. In an alternative embodiment, said heating of said step (C) is conducted at a temperature of 600 to 800° C.

Then, a reduction reaction is conducted to said tin dioxide to obtain tin (step (D)). In an alternative embodiment, hydrogen is supplied into during said step (D) to let said tin dioxide react with hydrogen as the following chemical equation and generate tin:

$SnO_2 + 2H_2 \rightarrow Sn + 2H_2O$.

In a preferable embodiment, said reduction reaction is conducted by heating said precipitate of step (C) in a gas mixture of hydrogen and nitrogen. Said gas mixture comprises: 20 to 30% (v/v) of hydrogen; and 70 to 80% (v/v) of nitrogen; wherein said % (v/v) is based on the total volume of said gas mixture. In an alternative embodiment, said gas mixture is supplied to said reduction reaction as a gas flow with a flow speed of 100 to 500 ml/min Preferably, said gas mixture is continuously supplied into said reduction reaction so that the starting chemicals (the left hand side of the aforesaid chemical equation) are maintained in saturation and the reaction is forced toward the right hand side where the product is generated to achieve balance in the equation. In a preferable embodiment, said reduction reaction is conducted at a temperature of 600 to 800° C.

In a preferable embodiment, the present method further comprises a filtration step after said step (A) to filter out the impurity in said wash-off solution. Said impurity may comprise silver-containing precipitate.

In a preferable embodiment, the present method further comprises a washing step after said step (B). Said washing step is to add a large amount of water into said wash-off solution and mix them sufficiently so that the Sodium salt contained in said wash-off solution can dissolve in the water. Then, another filtration step can be conducted to separate the solid components and the liquid components of said wash-off solution.

In an alternative embodiment, said filtration step is a filter-paper filtration, a bag filtration, a filter-press filtration, a vane filtration, a cross-flow filtration, a centrifugal filtration, a Dorr filtration, a hydraulic cyclone filtration, a membrane filtration, or a combination thereof.

The fourth aspect of the present invention is a reaction tank. In an alternative embodiment, the present reaction tank is particularly designed to co-operate with the present method for tin-recycling and therefore is particularly suitable for the recycle and purification of Tin.

Figure 1:
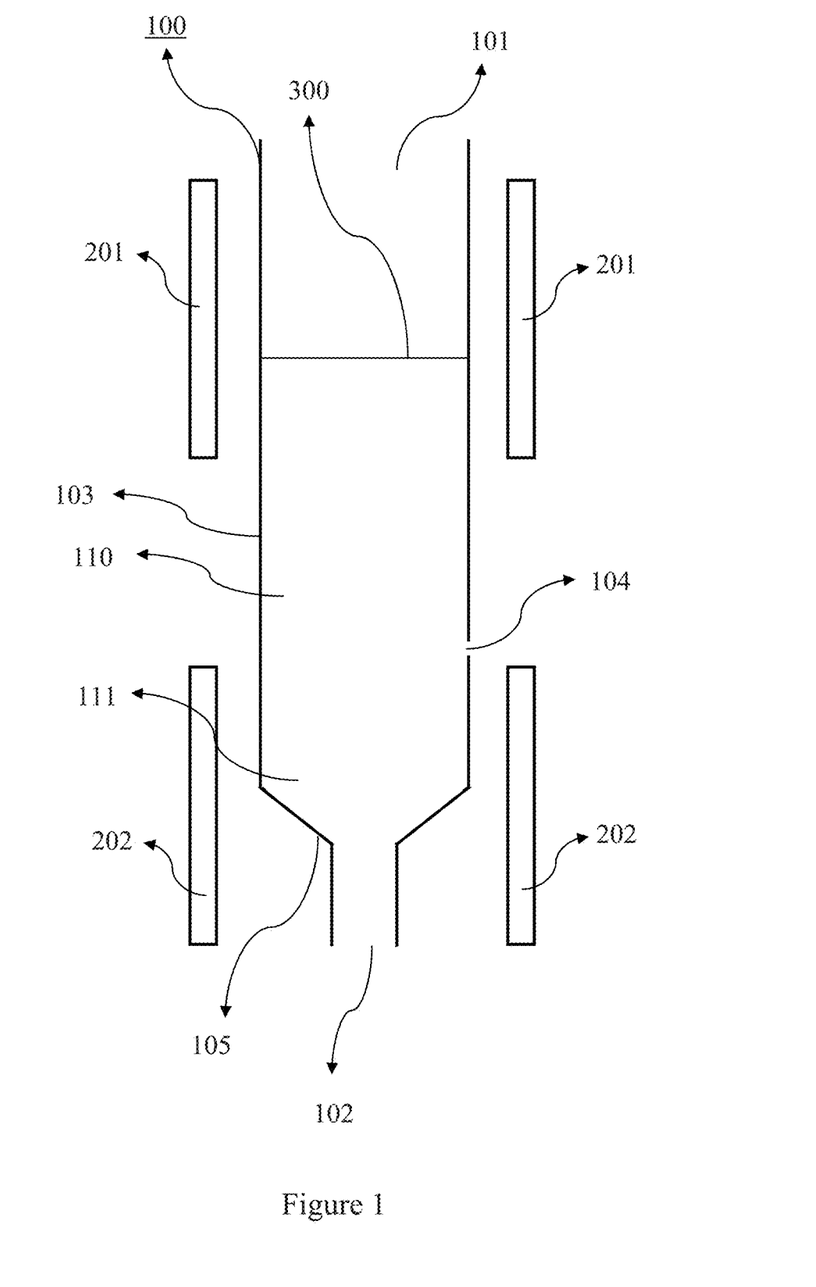
FIG. 1 shows an embodiment of the reaction tank of the present invention.
Figure 2:
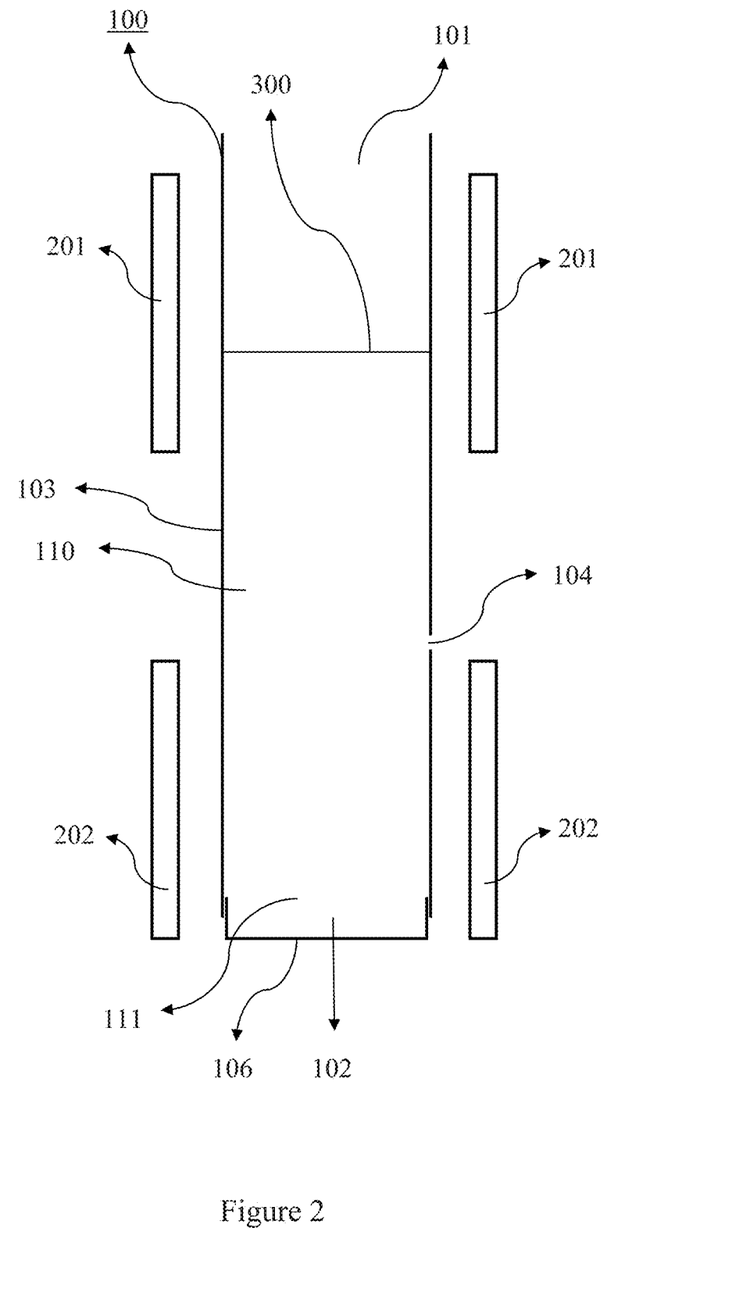
FIG. 2 shows another embodiment of the reaction tank of the present invention.

Please refer to FIG. 1 and FIG. 2, which respectively show the two embodiments of the present reaction tank. The present reaction tank illustrated in the aforesaid figures comprises: a body 100 comprising an inlet 101, an outlet 102, a sidewall 103, and a gas inlet 104; wherein said sidewall 103 defines an inner space 110; wherein an area of said inner space 110 adjacent to said outlet is a collection area 111; at least a heating apparatus (first heating apparatus 201 and second heating apparatus 202); and a sieve 300 positioned inside said inner space 110 and divides said inner space 110 into two spaces.

Between the embodiments illustrated in FIGS. 1 and 2, the two bodies 100 are different in the structure of said collection area 111. In FIG. 1, said body 100 is configured as a tapered structure 105 at said collection area; wherein the width of said tapered structure 105 is gradually reduced along with the vertical axis of said body and the end of said tapered structure 105 is configured to connect with said outlet 102. In FIG. 2, said body 100 is configured as a collection tray 106 at said collection area; wherein said collection tray is positioned at said outlet 102 for collecting products (ex. tin) and can be taken away separately from said body 100 for delivery of products.

In the embodiments illustrated in FIGS. 1 and 2, the two present reaction tanks both have two heating apparatus 201 and 202. The configuration is favorable for meeting different requirements of reaction temperature in different reaction sections. However, those having ordinary skill in the art can also use single heating apparatus to satisfy the heating purposes in the procedure by adjusting the temperature thereof. There is no particular limitation in the present invention as those having ordinary can also use two or more heating apparatuses for heating different reaction sections.

Although said first heating apparatus 201 and said second heating apparatus 202 seems to be configured at the bilateral sides of the body from the angle of view in the FIGS. 1 and 2, they are actually positioned to surround at least parts of said sidewall 103. In a preferable embodiment, said first heating apparatus 201 is positioned corresponding to the position of said sieve 300 in said inner space 110. In a preferable embodiment, said second heating apparatus 202 is positioned corresponding to the position of said collection area 111. In an alternative embodiment, said heating apparatus is a furnace, a heating tape, or a combination thereof.

In a preferable embodiment, said sieve 300 has plural pores with an average diameter of 0.1 to 1 mm (said pores are not shown in the figures). In a preferable embodiment, said reaction tank further comprises a gas supply device; said gas supply device is connection with said inlet 104 for introducing the gas into said inner space 110.

Taking tin recycling procedure as an example, the precipitate obtained from said step (B) of the present method for tin-recycling is placed on said sieve 300 for following processes. The size of said precipitate is larger than the pores of said sieve 300 and would not fall through it; whereas, upon heating in said step (C) and introducing gas mixture ($H_2/N_2$) through said gas inlet 104 in said step (D) for reduction reaction, the melted tin can fall onto said collection area 111 through said pores.

Example 1

Test 1 for the Tin Stripping Efficiency of the Present Tin Stripping Solution

First of all, the tin stripping additive of the present invention was prepared. A copper corrosion inhibitor and a nickel corrosion inhibitor was mixed in a solvent in accordance with the following table 1 to obtain the present tin stripping additives of this example.

TABLE 1

Samples of the present tin stripping additives.

| Sample | Copper corrosion inhibitor | | Nickel corrosion inhibitor | | Solvent | |
|---|---|---|---|---|---|---|
| | kinds | wt % | kinds | wt % | kinds | wt % |
| A | Potassium phosphate | 5 | Sodium oxalate | 10 | water | 85 |
| B | Potassium dihydrogen phosphate | 10 | Ammonium chloride | 5 | water | 85 |
| C | Trisodium phosphate | 5 | Potassium carbonate | 5 | water | 90 |

The following experiments were conducted by using the sample B in the above Table 1. In this example, the efficiency of the tin stripping solution having the present Tin stripping additive in tin stripping was examined. Samples 1 and 2 of the tin stripping solution of this example was prepared in accordance with the following Table 2 and were applied to strip motherboards (Experiments 1 to 4).

TABLE 2

Samples of the present tin stripping solutions.

| Sample | The present tin stripping additive | nitric acid (68%) | water | Total volume |
|---|---|---|---|---|
| 1 | 300 mL | 300 mL | 400 mL | 1000 mL |
| 2 | 250 mL | 250 mL | 500 mL | 1000 mL |

Experiment 1

Figure 3:
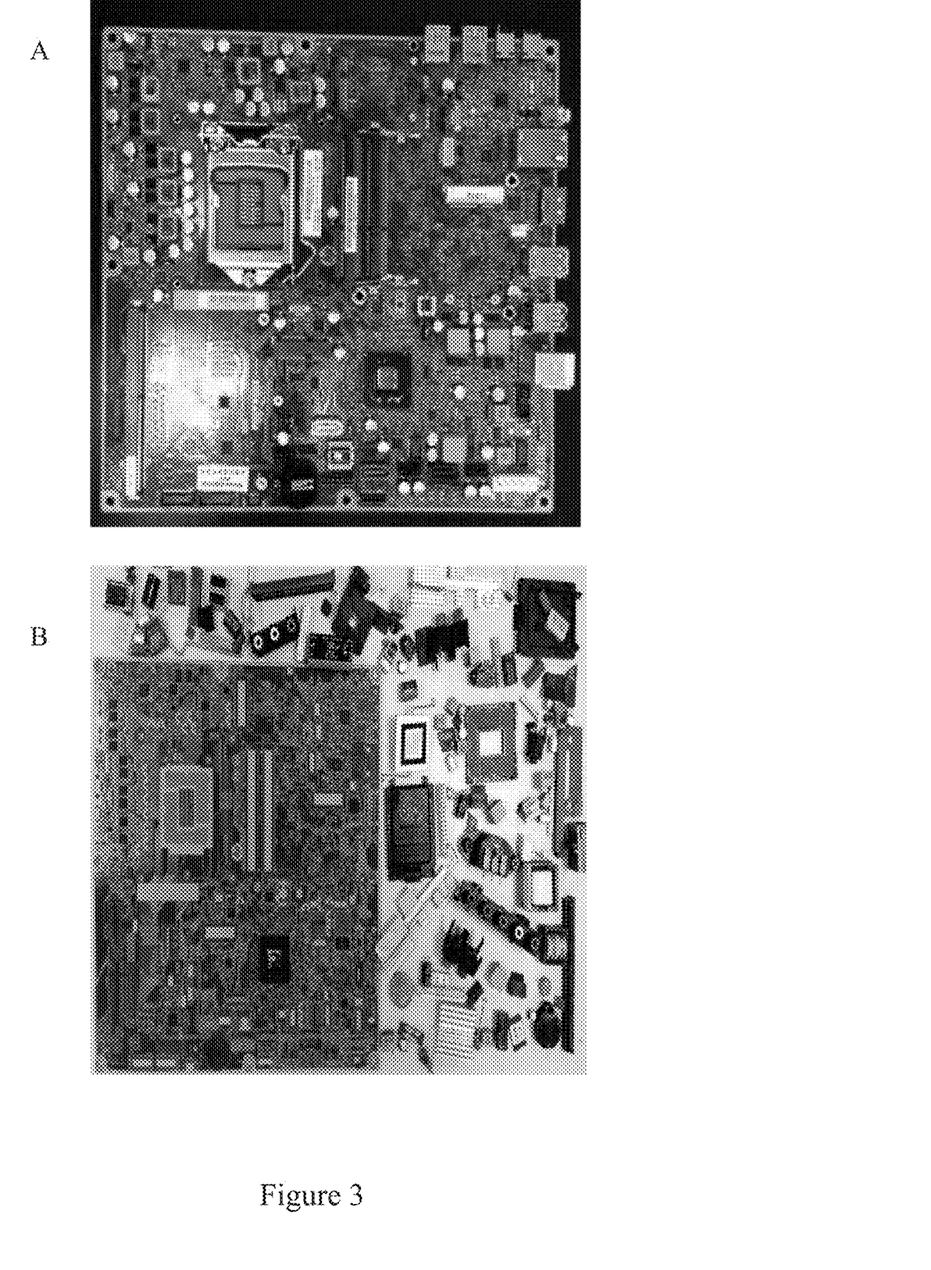
FIG. 3 shows the results of the Experiment 1 of the Example 1 of the present invention. (A) Before the tin-stripping process; (B) After the tin-stripping process.

A motherboard was immersed into said sample 1 at 20° C. for 30 minutes. Please see FIG. 3A and FIG. 3B. FIG. 3A showed a picture took before tin stripping treatment and FIG. 3B showed a picture took after. According to the figures, the tin stripping solution of the sample 1 successfully stripped the tin of the motherboard in 30 minutes.

Experiment 2

Figure 4:
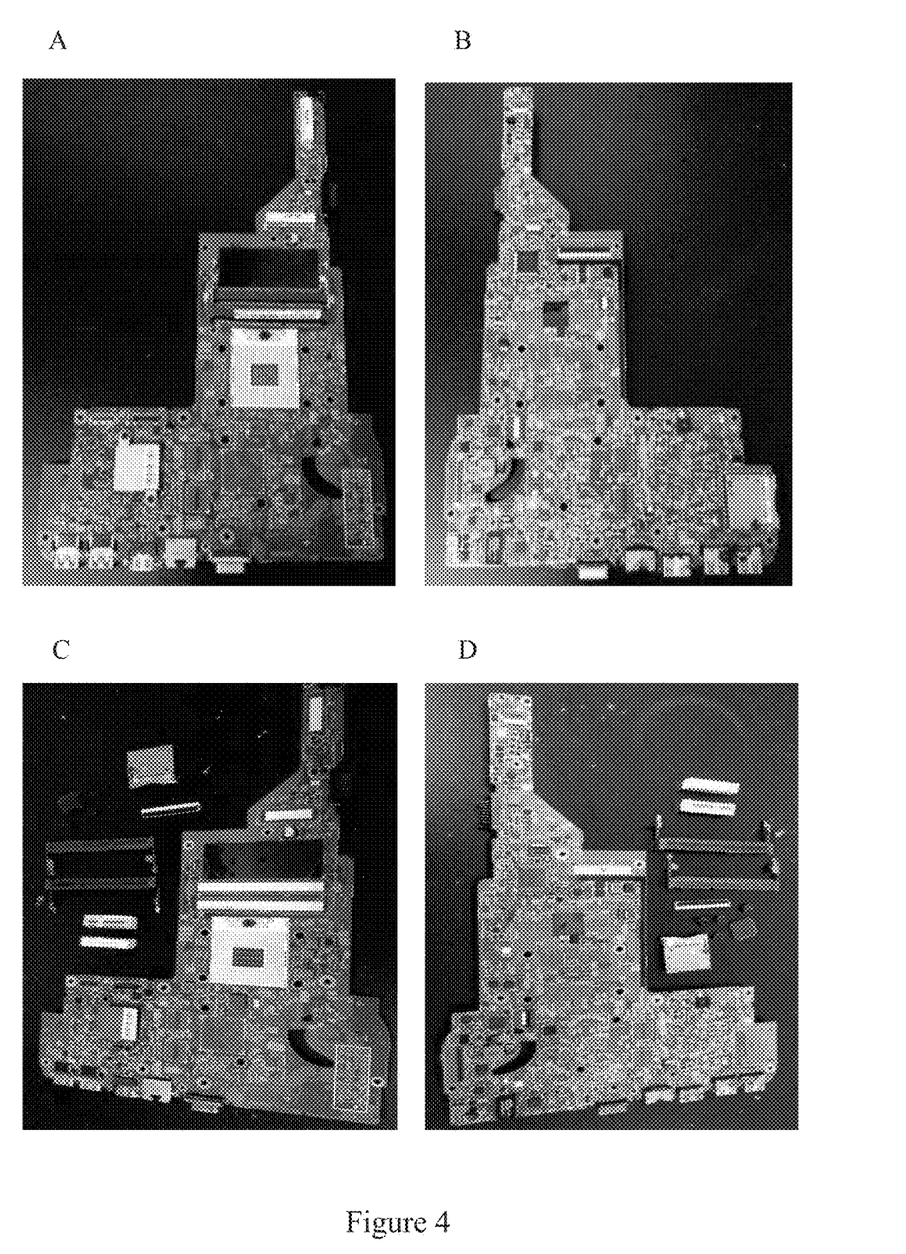
FIG. 4 shows the results of the Experiment 2 of the Example 1 of the present invention. (A) Before the Tin-stripping process, front side; (B) Before the tin-stripping process, back side; (C) After the tin-stripping process, front side; (D) After the tin-stripping process, back side.

A motherboard was immersed into said sample 2 at 25° C. for 20 minutes. Please see FIGS. 4A, 4B, 4C, and 4D. FIGS. 4A and 4B respectively showed a picture took before tin stripping treatment and FIGS. 4C and 4D respectively showed a picture took after. According to the figures, the tin stripping solution of the sample 2 successfully stripped the tin of the motherboard in 20 minutes. Moreover, it was noted from the figures that the copper layer on the motherboard, the nickel layer on the connector, and the legs of the fillet weld of the IC elements were not stripped by the tin stripping solution. It indicated that under proper treatment period, the present tin stripping solution exhibited specificity in stripping tin and would not strip other metals on the object to be processed. In other words, the tin can be recycled in better purity in the tin-recycling procedures thereafter.

Experiment 3

Figure 5:
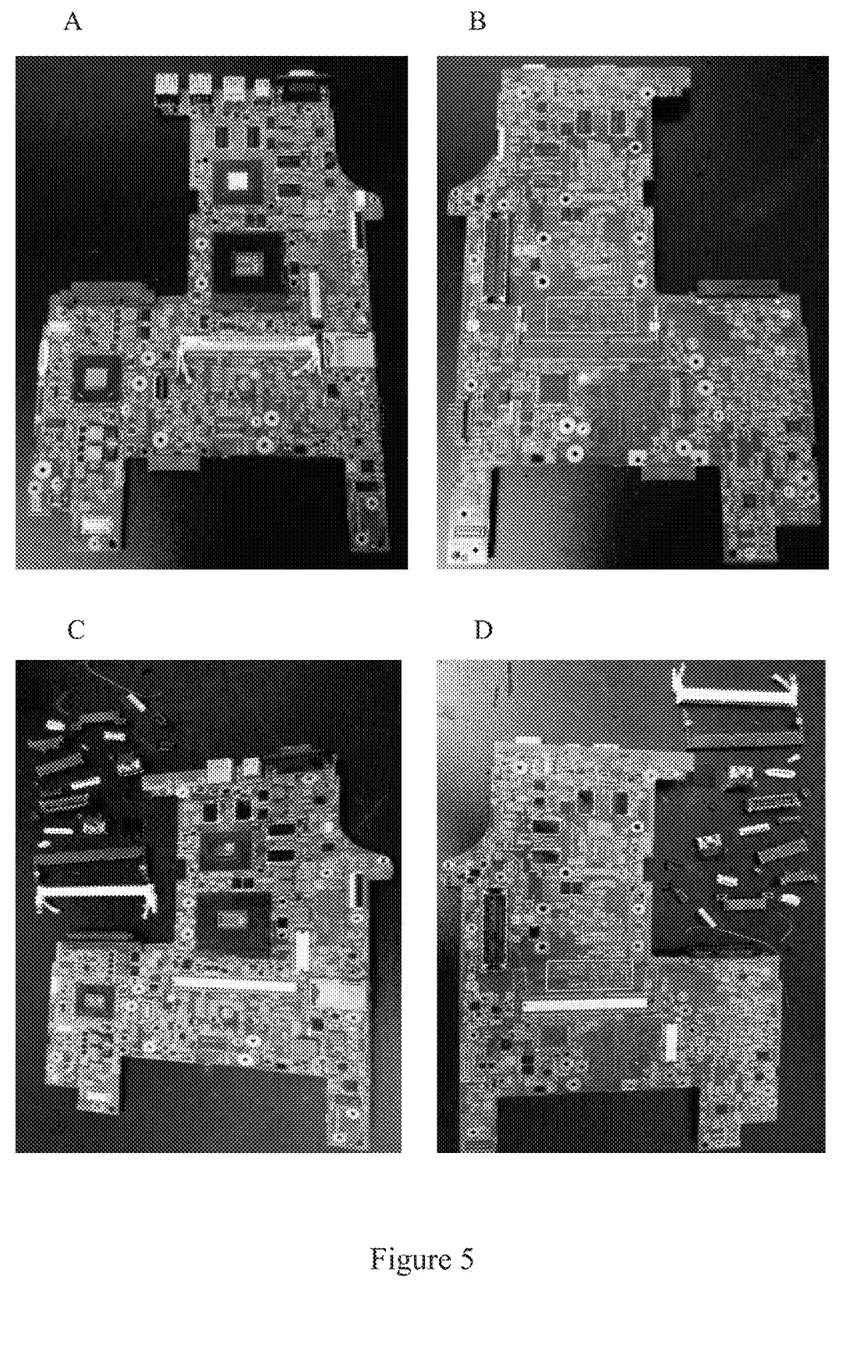
FIG. 5 shows the results of the Experiment 3 of the Example 1 of the present invention. (A) Before the tin-stripping process, front side; (B) Before the tin-stripping process, back side; (C) After the tin-stripping process, front side; (D) After the tin-stripping process, back side.

A motherboard was immersed into said sample 2 at 25° C. for 20 minutes. Please see FIGS. 5A, 5B, 5C, and 5D. FIGS. 5A and 5B respectively showed a picture took before tin stripping treatment (front side and back side respectively) and FIGS. 5C and 5D respectively showed a picture took after treatment. According to the figures, the tin stripping solution of the sample 2 successfully stripped the tin of the motherboard in 20 minutes. Moreover, it was noted from the figures that the copper layer on the motherboard, the nickel layer on the connector, and the legs of the fillet weld of the IC elements were not stripped by the tin stripping solution. It indicated that under proper treatment period, the present tin stripping solution exhibited specificity in stripping tin and would not strip other metals on the object to be processed. In other words, the tin can be recycled in better purity in the tin-recycling procedures thereafter.

Experiment 4

Figure 6:
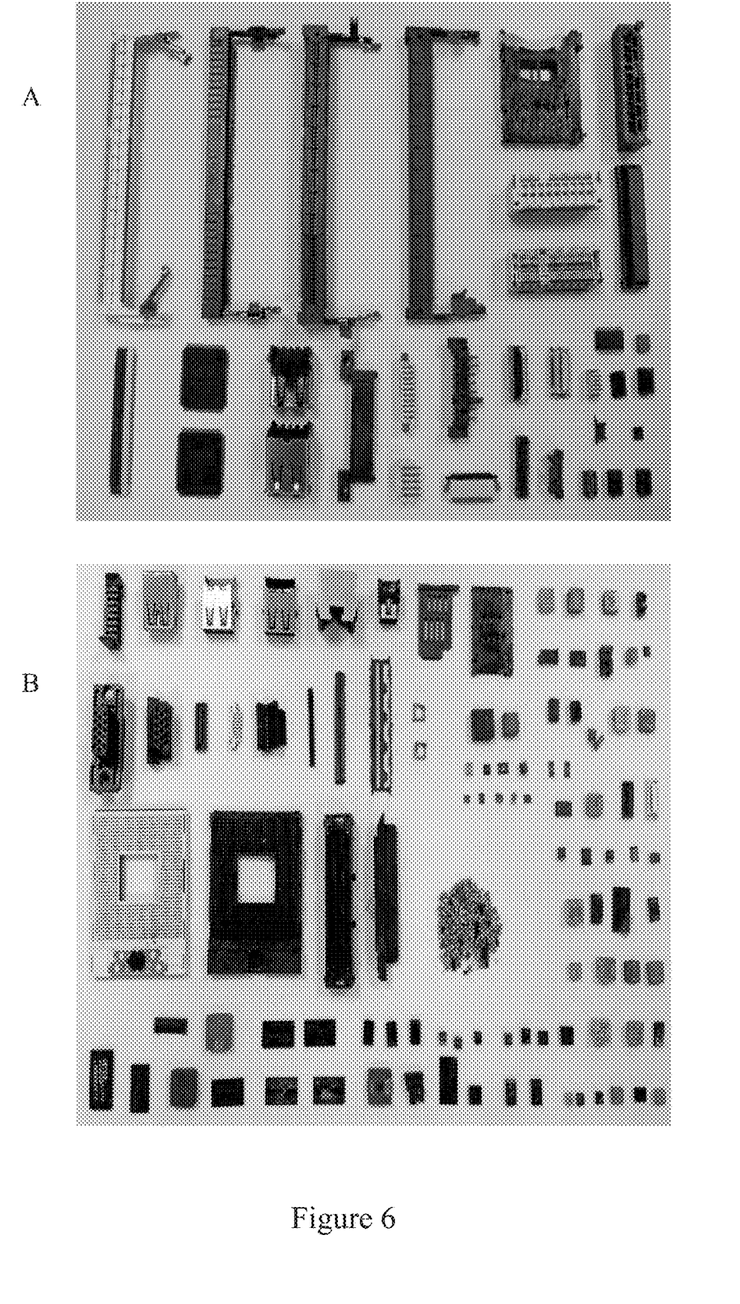
FIG. 6 shows the results of the Experiment 4 of the Example 1 of the present invention. (A) After the tin-stripping process, process time: 20 minutes; (B) After the tin-stripping process, process time: 1,000 minute.

Following the aforesaid Experiments 2 and 3, the components of the motherboards were further immersed in the tin stripping solution of sample 2 at 25° C. for 1000 minutes. It was noted that the copper layer on the motherboard was stripped and the legs of the fillet weld of the IC elements were detached while the nickel layer on the connector still remained no harm (FIGS. 6A and 6B).

Example 2

Test 2 for the Tin Stripping Efficiency of the Present Tin Stripping Solution

In this example, 6 PCB boards were respectively immersed in the tin stripping solution of Table 3 at 25° C. for 5 minutes. The strip ratio (SR) was calculated by the following equation for comparing the stripping efficiency of the present Tin stripping solutions.

$$\text{Strip ratio }(SR) = \frac{\text{Number of the electronic elements being stripped.}}{\text{Total number of the electronic elements of the board}} \times 100\%$$

TABLE 3

Samples of the present tin stripping solutions.

| Sample | The present tin stripping additive | nitric acid (68%) | water | Total volume |
| --- | --- | --- | --- | --- |
| 1 | 300 mL | 300 mL | 400 mL | 1000 mL |
| 3 | 500 mL | 500 mL | 0 mL | 1000 mL |
| 4 | 0 mL | 1000 mL | 0 mL | 1000 mL |

Figure 7:
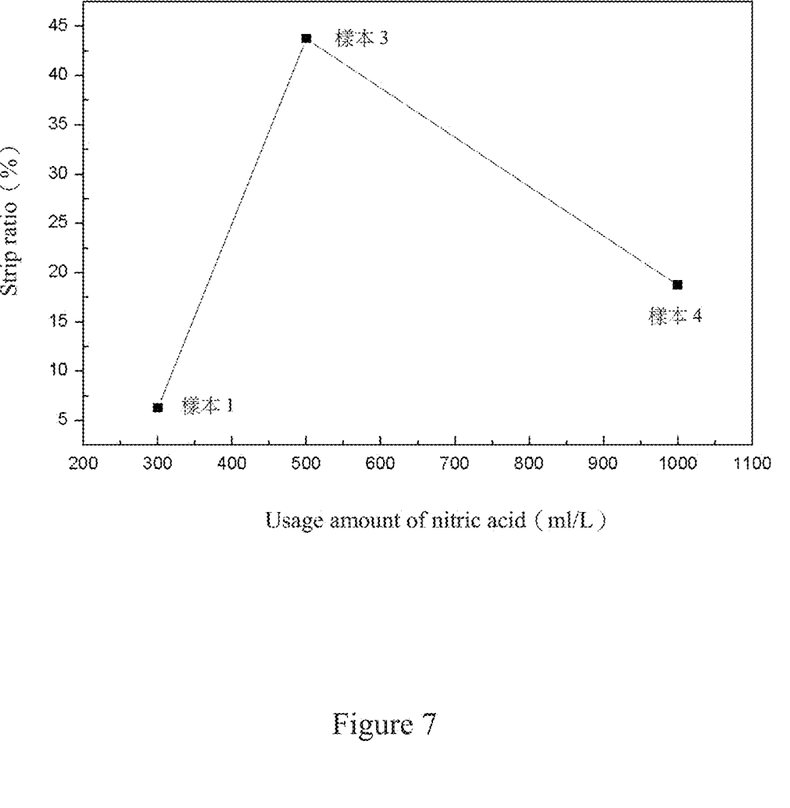
FIG. 7 shows the strip ratio of samples 1, 3, and 4 of the Example 2 of the present invention.

FIG. 7 respectively showed the strip ratio of samples 1, 3 and 4. The strip ratio of sample 3 was higher than that of sample 4. Sample 4 did not add the present tin stripping additive; that said, the results of this experiment indicated that adding the present tin stripping additive to replace half of the usage amount of nitric acid can not only reduce the usage amount of nitric acid but also increase the stripping efficiency. On the other hand, although the present tin stripping solution of sample 1 was not ranked as the best performance in the experiment, it was expected to be the safest in operation as containing the least usage of nitric acid. Therefore, the example further tested the strip ratio of sample 1 by extending the treatment period to see if it can provide liable performance.

The following table 4 showed that after extending the treatment period to 10, 20, or 30 minutes, the strip ratio of the sample 1 of the Tin stripping solution was gradually raised to 100%. It proved that an excellent strip ratio can also be achieved for sample 1 upon a slight increase in the treatment period.

TABLE 4

The test to the strip ratio of sample 1

| Treatment period (min) | strip ratio (%) |
| --- | --- |
| 10 | 10 |
| 20 | 30 |
| 30 | 100 |

Example 3

The Method for Tin-Recycling of the Present Invention

This example was conducted in follow of the above Example 2 to use the wash-off solution obtained by using sample 1 for stripping PCB board in the present method for tin-recycling. As the step (A) of the present method had been completed in Example 2, this example was started from the step (B). Before the step (B) was performed, said wash-off solution was analyzed by SEM-EDS and determined to contain the following components: Sn (contained 85.58 wt %), Cu (contained 0.46 wt %), Ag (contained 8.92 wt %), and Na (contained 5.04 wt %). In order to reduce the silver amount therein, a filtration step (filter-paper filtration) was conducted to remove the silver component therein. Sodium hydroxide was then added into said wash-off solution until achieving the equivalent point and a precipitate was generated accordingly. Tin (II) hydroxide was the main component of said precipitate.

Further according to the determination of SEM-EDS, it was expected that said precipitate shall also contain a significant amount of sodium component. In this regard, said precipitate was mixed with a large amount of water and another filtration step (filter-paper filtration) was conducted to remove the sodium component therein and obtain purified precipitate. A further SEM-EDS confirmed that the precipitate contained: Sn (contained 94.76 wt %), Cu (contained 0.43 wt %, and Na (contained 4.81 wt %). That said the aforesaid procedures indeed removed the silver component, reduced the Sodium component, and enriched the Tin component therein.

Afterwards, said precipitate was dried to obtain a tin-containing crude product. As the main component of said precipitate was tin (II) hydroxide, the main component of said Tin-containing crude product would be tin dioxide upon the heating of said step (C). It was noted that the heating of said step (C) can also be conducted in the reaction tank of the present invention.

Then, said tin-containing crude product (5 g) was placed on the sieve inside the reaction tank of the present invention and a $H_2/N_2$ gas mixture ($H_2:N_2=1:4$, volume ratio) was supplied into. A reduction reaction to the tin dioxide was conducted at high temperature by using the first heating apparatus (that is said step (D) of the present invention). Said tin-containing crude product was melted into liquid metal droplets in the reduction reaction of high temperature and dropped from the pores of said sieve to the collection area of the present reaction tank. In this example, the procedures were tested in accordance with the conditions listed in the following Table 5 to determine the optimal conditions.

TABLE 5

The conditions of the reduction reaction of this example

| Condition | Temperature of reaction | Time of reaction |
| --- | --- | --- |
| 1 | 800° C. | 2500 seconds |
| 2 | 800° C. | 4500 seconds |
| 3 | 700° C. | 4500 seconds |
| 4 | 600° C. | 4500 seconds |

Figure 8:
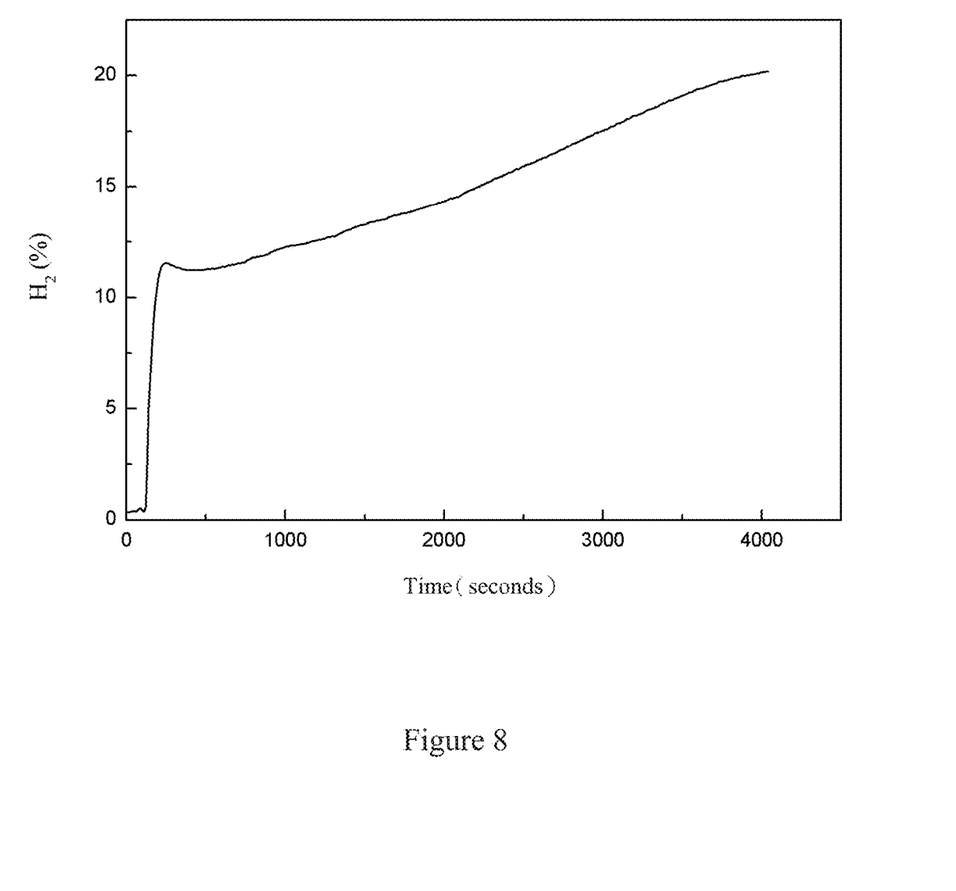
FIG. 8 shows the change in concentration of the hydrogen inside said reaction tank during the reduction reaction of the Example 3 of the present invention.

Said gas mixture was continuously supplied into the reaction and the concentration of $H_2$ inside said reaction tank was monitored (FIG. 8). The reaction was about to be completed while the concentration of $H_2$ inside said reaction tank was approaching to 20% (v/v). By calculating from the information in the FIG. 8, the condition 1 of the Table 5 (time of reaction was 2500 seconds) was not sufficient to complete the reaction. The temperature around the collection area of the present reaction tank was maintained at about 300° C. by the second heating apparatus to ensure the Tin metal droplets stayed melted. The weight of the Tin mass obtained was measured and listed in the following Table 6 comparing with theoretical value.

Since the main component of said tin-containing crude product was tin dioxide, theoretically every 5 gram of said tin-containing crude product was expected to contain 3.93 gram of tin (molecular weight of tin/molecular weight of tin dioxide×5 g=3.93 g). According to the results, the reduction reaction at 800° C. (condition 2) obtained the tin with the highest purity (being closest to the theoretical value).

TABLE 6

The weight of the tin mass obtained in condition 2, condition 3 and condition 4 (the theoretical value is 3.93 gram)

| Condition | Temperature of reaction | Weight of Tin mass (g) |
|---|---|---|
| 2 | 800° C. | 3.88 |
| 3 | 700° C. | 4.30 |
| 4 | 600° C. | 4.89 |

Figure 9:
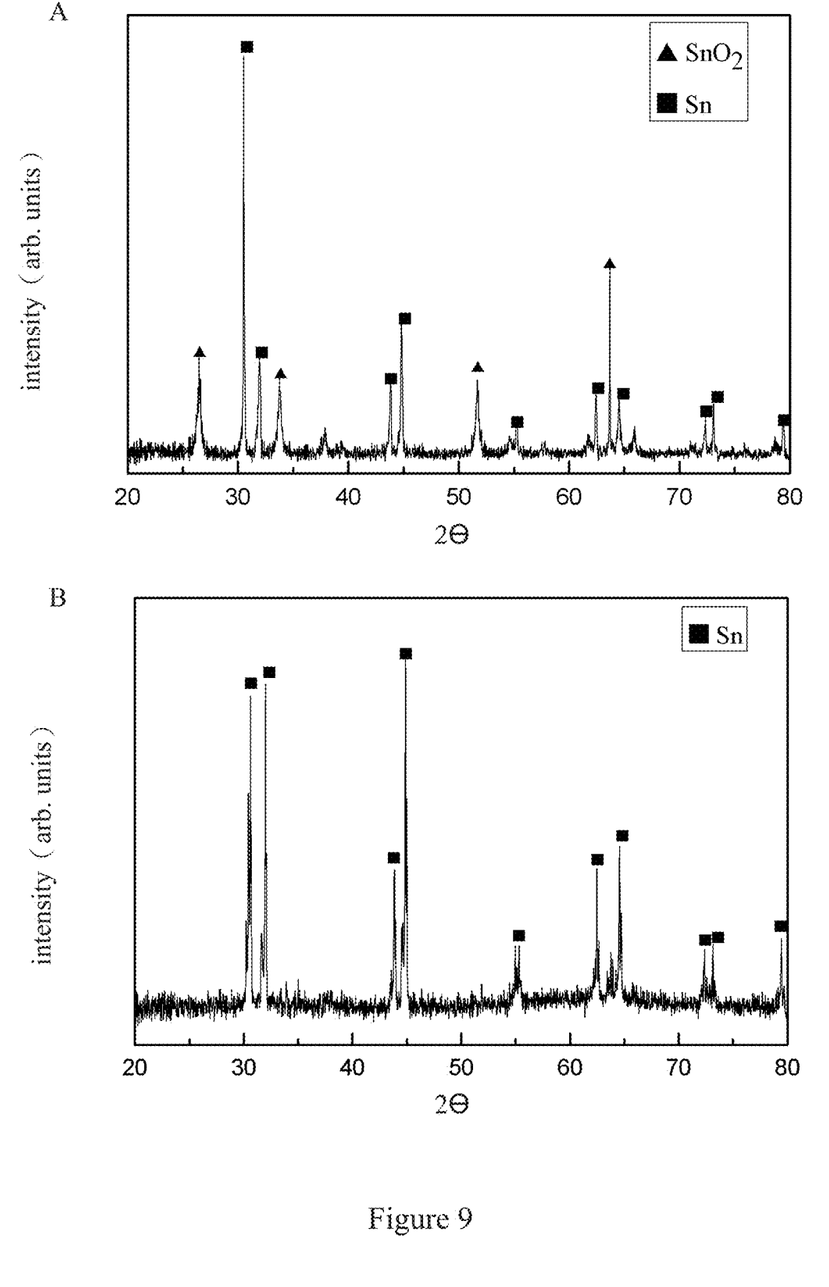
FIG. 9 shows the XRD spectrum of the tin mass obtained in the Example 3 of the present invention. (A) Condition 1; (B) Condition 2.

Furthermore, FIGS. 9A and 9B respectively showed the XRD spectrum of the tin mass obtained in said condition 1 and condition 2. According to the XRD spectrum, there was tin dioxide remained in the product of condition 1 showing that the time of reaction was not sufficient to complete the reaction. Whereas, there was no tin dioxide remained in the product of condition 2 indicating the reaction was completed. Besides, the tin mass of said condition 2 was further analyzed by SEM-EDS and the results showed that the tin mass contained 99.68 wt % of tin and a small amount of copper (0.32 wt %). In light of the foregoing, the present method for tin-recycling was proved to be able to obtain tin of high purity.

The invention claimed is:

1. A method for tin-stripping, comprising
providing a stripping solution comprising 20 to 50% (v/v) of nitric acid and 20 to 50% (v/v) of a stripping additive; wherein said stripping additive comprises, by weight of said stripping additive:
0.1 to 20 wt % of trisodium phosphate;
0.1 to 20 wt % of potassium carbonate; and
remaining wt % of said stripping additive is a solvent;
immersing an object having tin in said stripping solution to obtain a wash-off solution; and
collecting said wash-off solution.

2. The method of claim 1, further comprising adding an alkaline solution to said wash-off solution to obtain a precipitate.

3. The method of claim 2, further comprising heating said precipitate.

4. The method of claim 3, further comprising conducting a reduction reaction to said precipitate being heated to obtain tin.

5. The method of claim 1, wherein said immersing is achieved by placing said object to be processed into a bath of said tin stripping solution.

6. The method of claim 5, wherein said bath is of a temperature of 20 to 60° C.

7. The method of claim 2; wherein said alkaline solution is sodium hydroxide, potassium hydroxide, or a combination thereof.

8. The method of claim 3, wherein said heating step is conducted at a temperature of 600 to 800° C.

9. The method of claim 4, wherein said reduction reaction is conducted by heating said precipitate in a gas mixture atmosphere of hydrogen and nitrogen.

10. The method of claim 9, wherein said gas mixture comprises:
20 to 30% (v/v) of hydrogen; and
70 to 80% (v/v) of nitrogen;
wherein said % (v/v) is based on the total volume of said gas mixture.

* * * * *